Feb. 14, 1939.　　　W. BOXAN　　　2,147,518

SPRING SUSPENSION

Filed Feb. 6, 1937

Inventor:
Walter Boxan

Patented Feb. 14, 1939

2,147,518

UNITED STATES PATENT OFFICE 2,147,518

SPRING SUSPENSION

Walter Boxan, Zschopau, in Saxony, Germany, assignor to Auto Union Aktiengesellschaft, Chemnitz, Germany Application February 6, 1937, Serial No. 124,488
In Germany February 8, 1936

1 Claim. (Cl. 267—21)

This invention relates to a spring suspension, more particularly for automobiles with independent wheels.

Springing arrangements using prismatic rubber members are known, in which an axle member is directly connected to a frame member by the rubber member. In this case the spring action is not obtained by shear stresses of the rubber member in the direction of its surfaces of adhesion, but by torsion stresses of the rubber member between its surfaces of adhesion. The sprung axle member is carried directly by the prismatic rubber members which causes considerable additional shear stresses in the direction of the surfaces of adhesion. In this case neither the guiding nor the springing of the axle member with respect to the frame is satisfactorily obtained.

In contradistinction thereto, the novelty of the invention consists in this, that an axle member guided in the frame is directly connected to a frame member by the rubber prismatic member, which is subjected to shear stresses in the direction of its surfaces of adhesion. In this case the spring action is obtained entirely by the shear stressing of the rubber member, which remains constant in all planes parallel to the surfaces of adhesion. In this way a very great spring effect can be obtained with springs of small volume. Owing to the absence of any superfluous connecting members between the axle and frame member, the springing arrangement can be constructed in a manner which is simple as well as compact. Since the axle member is guided in the frame, the rubber member need not take up any supporting forces which would cause additional stresses in it. Particularly advantageous constructions are obtained if the prismatic rubber member is arranged between a link member extension and an oppositely disposed frame member or between the stub axle carrier and an oppositely disposed frame member. In each case a very economical construction is obtained because it is completely reliable and requires no additional attention.

The invention is illustrated in several constructional examples in the accompanying drawing.

Figure 1:
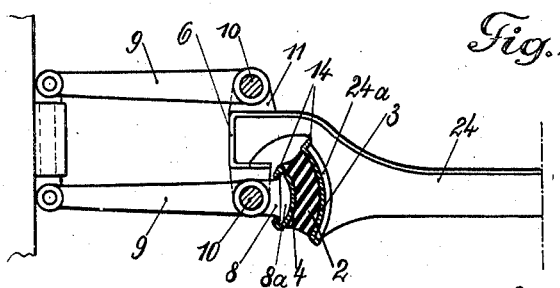
Fig. 1 is a vertical section through a link quadrilateral swinging across the direction of travel.

In the constructional example according to Fig. 1 the wheel is guided parallel to the longitudinal central plane by means of a quadrilateral consisting of two link members 9. The link members 9 are mounted, by means of journals 10, in brackets 11 which are secured to the longitudinal frame member 6. The rubber member 2, which is subjected to shear stresses in the direction of its surfaces of adhesion, is arranged between an inwardly directed extension 8 of the link member 9 and a transverse member 24 connected to the frame member 6. The extension 8 is for this purpose provided with a plate 8a curved around the bearing centre and carrying the one adhesion plate 4 of the rubber member 2, while the transverse frame member 24 is also provided with a plate 24a curved around the bearing centre and carrying the other adhesion plate 3 of the rubber member 2. The adhesion plates 3, 4 are pushed over the bearing plates 8a, 24a, with hooked parts 14. The rubber member 2 is subjected to a certain initial compression when being placed between the parts 8a, 24a.

Figure 2:
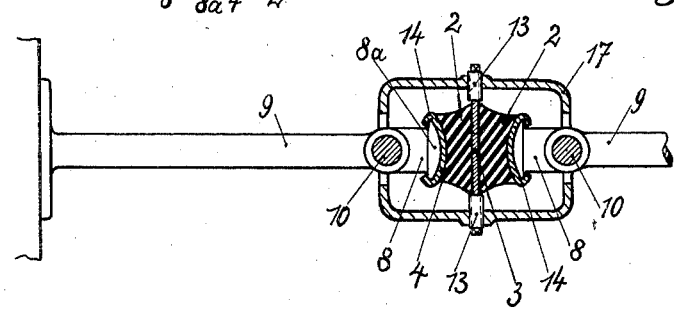
Fig. 2 is a vertical section through a swinging half axle.

In the constructional example according to Fig. 2, the wheel is guided by means of a swinging half axle 9, which is mounted by means of a journal 10 in the longitudinal central frame member 17. The rubber member 2, subjected to shear stresses, is arranged between an extension 8 projecting into the frame member 17 and the frame member 17 itself. The axle extension 8 is for this purpose provided with a plate 8a curved around the bearing centre, which carries one adhesion plate 4 of the rubber member 2, while the other adhesion plate 3 is inserted in the frame member 17. The plate 4 is pushed over the bearing plate 8a with hooked parts, while the plate 3 is rigidly fixed in the frame member 17 by means of screw bolts. The rubber members 2 belonging to one axle are connected together by means of the adhesion plate 3. For varying the spring tension, the plate 3 can be adjusted with respect to the frame member 17 by means of the screw bolts 13.

Figure 3:
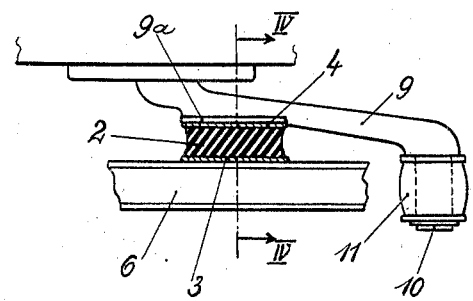
Fig. 3 is a horizontal section through a link member swinging in the direction of travel.
Figure 4:
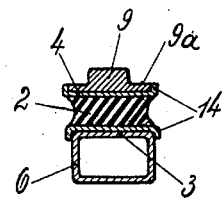
Fig. 4 is a section along the line IV—IV in Fig. 3.

In the constructional example according to Figs. 3 and 4 the wheel is guided by a link member 9 swinging in the direction of travel. The link member is mounted by means of a journal 10 in a bracket 11 secured on the end of the longitudinal frame member 6. The rubber member 2, subjected to shear stresses, is arranged between the link member 9 and the longitudinal frame member. For this purpose the link 9 is provided on the inner side with a plate 9a, which is placed parallel to the web of the frame member 6 and carries an adhesion plate 4 of the rubber member 2, while the other adhesion plate 3 is directly supported by means of the frame member 6. The adhesion plates 3, 4 embrace the parts 9a, 6 with hooked parts 14. The rubber member 2 is preferably arranged at such a distance from the journal 10 that it largely relieves the latter from the bearing pressures due to the lateral forces.

What I claim is:—

A springing arrangement more particularly for automobiles with independent wheels comprising a vehicle frame, a journal member on said frame, a wheel, supporting means for said wheel pivoted on said journal member, spaced plates arranged in succession between the supporting means and the frame transversely to the swinging plane of the supporting means on the side of the journal member opposite said wheel, said plates being connected respectively with the supporting means and the frame, at least one of said plates being curved about the axis of the journal member, and a rubber member adhesively connected with the plates and subjected to shear stresses between said frame and said supporting means.

WALTER BOXAN.